United States Patent [19]
Smart

[11] Patent Number: 5,477,289
[45] Date of Patent: Dec. 19, 1995

[54] CAMERA INCLUDING MULTIPLE BURST DATA TO IDENTIFY UNEXPOSED FRAMES

[75] Inventor: David C. Smart, Fairport, N.Y.

[73] Assignee: Eastman Kodak Company, Rochester, N.Y.

[21] Appl. No.: 217,996

[22] Filed: Mar. 25, 1994

[51] Int. Cl.⁶ .................................................. G03B 17/24
[52] U.S. Cl. ............................................. 354/106; 354/207
[58] Field of Search ...................................... 354/105, 106, 354/207

[56] References Cited

U.S. PATENT DOCUMENTS

| | | | |
|---|---|---|---|
| 4,860,037 | 8/1989 | Harvey | 354/105 X |
| 4,864,332 | 9/1989 | Harvey | 354/105 X |
| 4,878,075 | 10/1989 | Cannon | 354/106 X |
| 5,006,873 | 4/1991 | Wash | 354/106 |
| 5,016,030 | 5/1991 | Dwyer et al. | 354/106 X |
| 5,017,326 | 5/1991 | Wash et al. | 354/207 |
| 5,130,745 | 7/1992 | Cloutier et al. | 354/106 X |
| 5,325,138 | 6/1994 | Nagata | 354/106 |

*Primary Examiner*—Richard A. Wintercorn
*Assistant Examiner*—J. K. Han
*Attorney, Agent, or Firm*—Francis H. Boos, Jr.

[57] ABSTRACT

A camera of the prewind or normal wind type that writes data on a roll of film to indicate where specific frames on the roll of film have been exposed and unexposed and detects the presence of that data on the film to determine where additional exposures may be made on the roll of film. The camera writes data on the magnetically sensitive layer of the roll of film in bursts, wherein each burst is separated from each other burst with nonwritten portions of film. BY using one pattern of data and spaces for the marking of exposed frames and another pattern for unexposed frames, prewind and normal wind cameras can interchange partially exposed rolls of film without explicitly decoding magnetic data.

6 Claims, 11 Drawing Sheets

CAMERA INCLUDING MULTIPLE BURST DATA TO IDENTIFY UNEXPOSED FRAMES

FIELD OF THE INVENTION

The invention relates generally to the field of photographic cameras, and particularly to photographic cameras that allow a camera user to remove a partially exposed roll of film, and reintroduce that roll of film to the same or another camera, with subsequent exposures made only on unexposed frames.

BACKGROUND OF THE INVENTION

The problem with film cameras that add exposures to a partially exposed roll of film is a familiar one. After reinserting partially exposed film back into a camera, there is a need for a simple, reliable and inexpensive way of preventing a camera from creating double exposures, particularly when the film is reloaded after prior exposures have been made in a different camera.

If a 35 mm camera user wanted to remove a roll of film from a camera and reintroduce that roll of film into another camera, the camera user would have a great deal of difficulty in performing this task without producing any double exposures or wasting any film. The reason for the above is that exposures are usually started from different locations of the roll of film and oftentimes two different cameras will not wind or rewind the exact same length of film each time.

Normal 35 mm film has a continuous set of perforations along both edges of the film throughout its length. Exposures have no prealocated position on the roll of film. Thus, a mid-roll interrupt camera that uses 35 mm film has to not only find out which exposures have been made, but also where the exposures are located on the roll of film.

In 110 and 126 film, the perforations along the edge of the film uniquely identify each exposure area so that all camera's will place the same numbered exposure at the same location on the roll of film. The task remaining for the mid-roll interrupt camera is to mark the exposures that have been made and determine which exposures have not been made.

Most cameras require a camera user to place a roll of film in the camera and expose one or more frames of the roll of film. In a normal-wind camera, exposures are made on a roll of film as the film is pulled out of the cartridge. When all of the frames on the roll of film are exposed, the roll of film is wound back into the cartridge. The first exposure will be at the leader end of the roll of film and the last exposure will be near the cartridge spool. In a prewind camera the entire roll of film is pulled out of the cartridge (over to the take up side) before the first exposure is made. Then, the exposures are made as the roll of film is wound incrementally back into the cartridge. The first exposure will be near the cartridge spool and the last exposure will be at the leader end of the roll of film.

Mid-roll interrupt cameras have been developed to allow a camera user to remove a partially exposed roll of film and reintroduce that roll of film to the same or another camera, with exposure continuing on unexposed frames only. In a mid-roll interrupt camera no exposures will be lost and no double exposures will be allowed to take place. Typically, a mid-roll interrupt camera will utilize a roll of film that has magnetics on the film. The magnetics on the film is a magnetically sensitive layer on the roll of photographic film that allows equipment to write and/or read on that magnetically sensitive layer.

One type of mid-roll interrupt camera, (presence of signal type) writes information on a magnetically sensitive layer of a roll of film as it advances film after each exposure is made. Thus, a trail of magnetic data will be left near the location of each exposure. When a partially exposed roll of film is removed from one mid-roll interrupt camera and placed in another mid-roll interrupt camera, the other camera will read the magnetic data. The presence of written magnetic data will indicate that particular frames have been exposed and the absence of magnetic data will indicate that the frame has not been exposed.

Another type of mid-roll interrupt camera (decoded data type) writes information on a magnetically sensitive layer of the roll of film when the mid-roll interrupt feature is requested. When a partially exposed roll of film is removed from one mid-roll interrupt camera and placed in another mid-roll interrupt camera, the other camera will find that magnetic data and decode it to find the unexposed frames.

PROBLEMS TO BE SOLVED BY THE INVENTION

The "presence of the signal" method of marking and finding exposures requires a choice of prewind or normal wind for all cameras exposing the same rolls of film. Otherwise either double exposure of frames exposed in prewind wind cameras by normal wind cameras will occur or normal wind cameras will have to look at the entire roll of film prior to subsequent exposure just to be sure that there are no prewind exposures on the roll of film.

A disadvantage of a mid-roll interrupt camera that utilizes the decoded data is that the camera would have to read and decode magnetic data. This is very costly.

SUMMARY OF THE INVENTION

The present invention overcomes the disadvantages of the prior art by providing prewind and normal wind cameras that both allow mid-roll interrupt rolls to be safely interchanged. The camera writes data on the magnetically sensitive layer of the roll of film in a continuous stream as the film is advanced subsequent to each exposure. Each data recording is separated from each other data recording with nonwritten portions of film. When mid-roll interrupt is required of a prewind camera, two bursts of data are written at each unexposed frame as the roll of film is returned to the cartridge. Normal wind cameras detect the two bursts of data left by the prewind camera indicating that exposure exits at the spool end of the roll of film.

ADVANTAGEOUS EFFECTS OF THE INVENTION

An advantage of this invention is that both prewind and normal wind cameras may provide the mid-roll interrupt feature without costly decoding equipment.

The foregoing is accomplished by providing a camera having a recording device, wherein the recording device writes data on the roll of film contained in the camera when a photograph is taken to indicate that a photograph has been taken, the recording device writes different data on the roll of film corresponding to each unexposed frame of film to indicate that specific frames on the roll of film have not been exposed.

DESCRIPTION OF THE PREFERRED EMBODIMENTS

Figure 1:
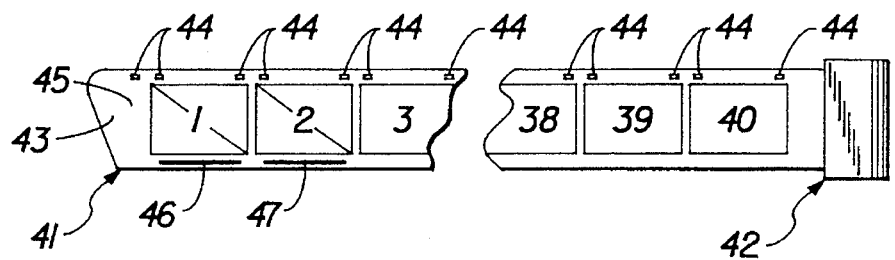
FIG. 1 is a drawing of a prior art roll of film that has been partially exposed in a normal wind "presence of signal" camera.

In order to better understand that which separates this invention from the prior art consider the following. Refer to the drawings in detail, and more particularly to FIG. 1, a prior art roll of film 41 may be wound into cartridge 42. Roll of film 41 has a leader end 43. Frames 1, 2, 3, 4, . . . 39 and 40 are respectively located between two successive perforations 44 on roll of film 41. A magnetic layer 45 is deposited on roll of film 41 and information may be recorded on allocated spaces on layer 45.

Roll of film 41 is shown with two exposures made in a normal wind camera, i.e. the frames closest to leader end 43 are exposed, namely frames 1 and 2. This camera would respectively write information at locations 46 and 47, indicating that frame 1 and frame 2 would have been respectively exposed.

Figure 2:
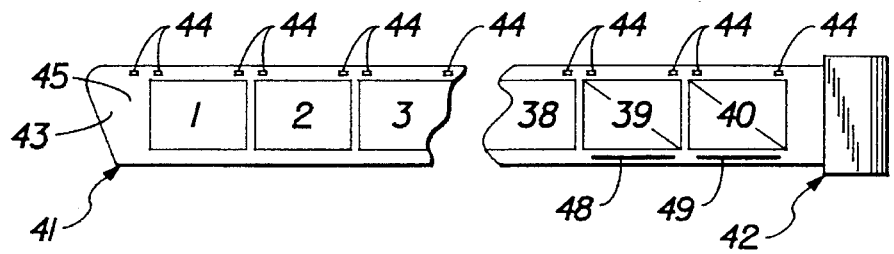
FIG. 2 is a drawing of a prior art roll of film that has been partially exposed in a prewind "presence of signal" camera.

FIG. 2 is a drawing of a prior art roll of film 41 that may be used by a prior art pre-wind camera. Roll of film 41 may be wound into cartridge 42. Frames 1–40 appear on roll of film 41. Roll of film roll 41 has a leader end 43. Frames 1, 2, 3, 4, . . . 39 and 40 are respectively located between two successive perforations 44. A magnetic layer 45 is deposited on roll of film 41 and information may be recorded on allocated spaces on layer 45.

When a pre-wind mid-roll interrupt camera exposes the first two frames on roll of film 41, the frames closest to cartridge 42 would be exposed, namely frames 39 and 40. The mid-roll interrupt camera would respectively write information at locations 48 and 49, indicating that frame 39 and frame 40 have been respectively exposed.

Thus, FIGS. 1 and 2 illustrate a problem that occurs when roll of film 41 is taken from the pre-wind mid-roll interrupt camera and subsequently placed in a normal wind mid-roll interrupt camera. The normal wind mid-roll interrupt camera will either see no data at frame 1 and expose all of roll of film 41 or the camera will have to advance the entire length of roll of film 41 to look for the exposures taken in frames 39 and 40. Thus, to be safe, the normal wind camera must read the whole roll of film before beginning.

Figure 3:
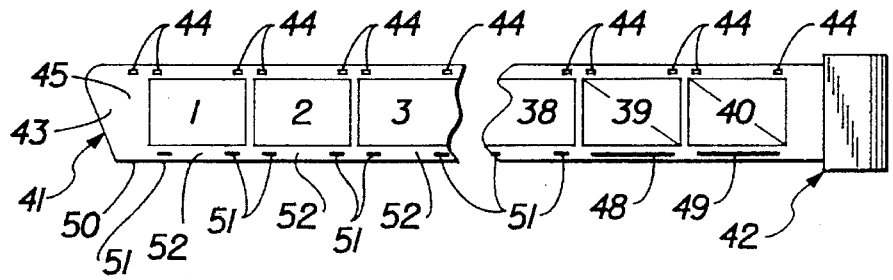
FIG. 3 is drawing of a roll of film that has been partially exposed in a pre-wind camera, as proposed herein.

Since this invention pertains to a recording device that enables prewind and normal wind cameras to support mid-roll interrupt without conflict, cameras of both types are described in the following embodiment. FIG. 3 is drawing of a roll of film 41 that has been partially exposed (frames 39 and 40) in a pre-wind camera. Frames 1–40 are located by perforations 44 and magnetic information may written along one of the sides of roll of film 41, i.e. side 50 in positions also located by perforations 44 corresponding with exposure as it is made.

When the camera user requests a mid-roll interrupt and wants to place roll of film 41 in another camera, the pre-wind camera winds all of film roll 41 back into cartridge 42. As the camera winds roll of film 41 back into cartridge 42, the camera writes data 51 in locations 52. Locations 52 have been reserved for each of the remaining frames i.e., frames 1–38 that have not as yet been exposed. However, in order to differentiate the data that indicates that an exposure has not been made from the data indicating that an exposure has been made, a pattern of short bursts of data are written, i.e. two bursts of data 51 are written for each unexposed frame.

If roll of film 41 is placed into a normal wind mid-roll interrupt camera, that camera can determine by detecting the presence of two bursts of data 51, in reserved location 52, that frame 1 is unexposed and that roll of film 41 has been partially exposed in a pre-wind mid-roll interrupt camera. Thereupon, the camera pulls roll of film 41 out of cartridge 42 as it detects data in each reserved location 52 until a frame with continuous data is found. Continuous data is found at locations 48 and 49 which respectively represent frames 39 and 40. Since continuous data indicates that specific frames have been exposed, the camera can wind roll of film 41 back to frame 1 and make its exposures and stop exposing frames before frame 39 would be double exposed.

Figure 4:
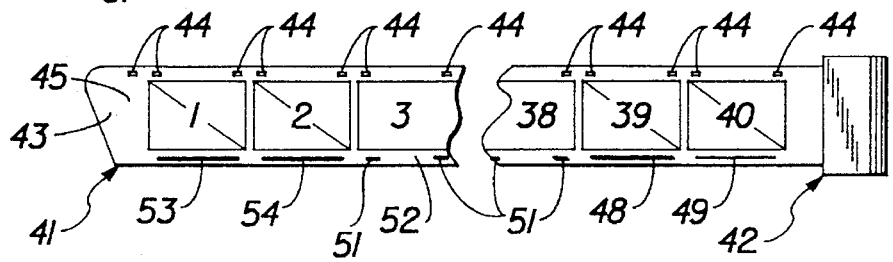
FIG. 4 is a drawing of the roll of film of FIG. 3 after the roll of film has been placed in a normal wind camera and two additional exposures have been placed on the roll of film.

FIG. 4 is a drawing of roll of film 41 of FIG. 3 after roll of film 41 has been placed in a normal wind mid-roll interrupt camera and two additional exposures have been made. Frames 1 and 2 have been exposed and continuous bursts of data are respectively written at locations 53 and 54 to indicate this fact (replacing the double burst data left by the prewind camera).

Figure 5:
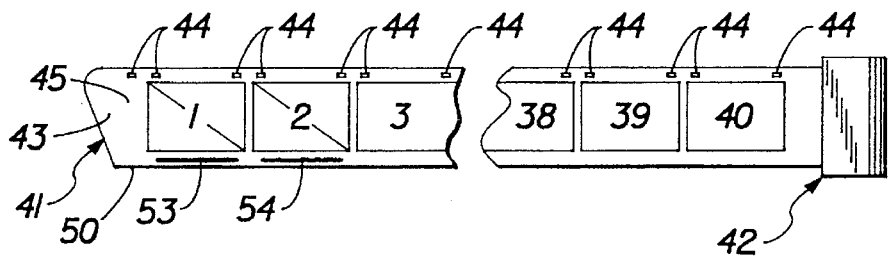
FIG. 5 is a drawing of a roll of film that has been partially exposed in a normal wind camera.

FIG. 5 is drawing of a roll of film 41 that has been partially exposed (frames 1 and 2) in a normal wind camera. Frames 1–40 are located by perforations 44 and magnetic information may be written along one of the sides of roll of film 41, i.e. side 50 in positions also located by perforations 44 corresponding with exposure as it is made. Magnetic data is respectively written at locations 53 and 54 to indicate that frames 1 and 2 have been respectively exposed.

When the camera user requests a mid-roll interrupt and wants to place roll of film 41 in another camera, the normal wind camera winds all of roll of film 41 back into cartridge 42.

Figure 6:
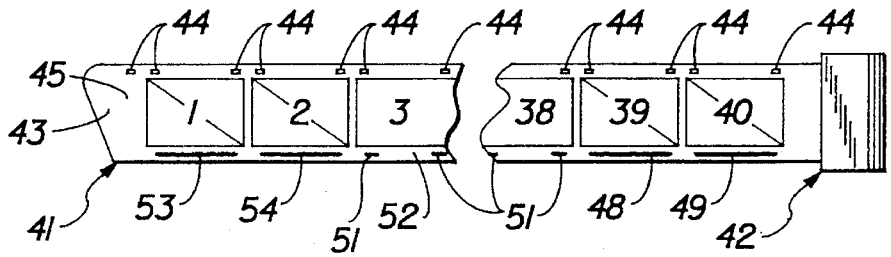
FIG. 6 is a drawing of the roll of film of FIG. 5 after the roll of film has been placed in a pre-wind camera as proposed herein and two additional exposures have been placed on the roll of film.

FIG. 6 is a drawing of roll of film 41 of FIG. 5 after roll of film 41 has been placed in a pre-wind mid-roll interrupt camera and two additional exposures have been made. Frames 39 and 40 have been exposed and continuous bursts of data are respectively written at locations 48 and 49 to indicate this fact. If the user now requests mid-roll interrupt the camera will write double bursts of data in locations 52 as it winds roll of film 41 back into cartridge 42. The camera will not write double burst data over the data 53 and 54 written by the normal wind camera. FIG. 4 also represents roll of film 41 of FIG. 6 after mid-roll interrupt from the principal camera. If roll of film 41 is loaded into a prewind mid-roll interrupt camera roll of film 41 will be withdrawn from cartridge 42 until the continuous recording at location 48 is found. Exposures will be made (counting down) until frame 2 (detected during prewind) is reached. Then the camera will return remaining roll of film 41 to cartridge 42.

Figure 7:
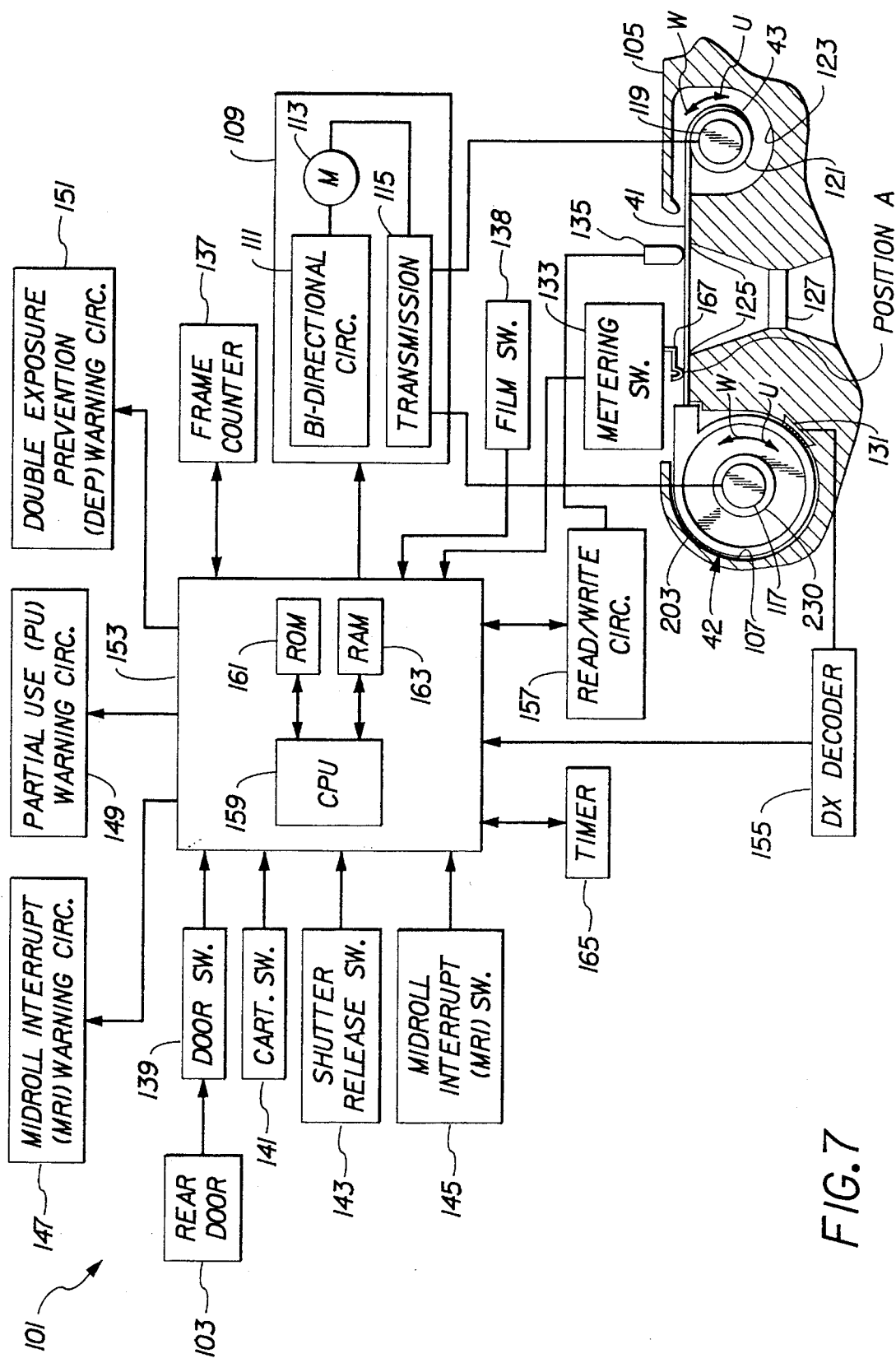
FIG. 7 is a schematic drawing of the camera that magnetically writes information on the rolls of film shown in FIGS. 3–6.

FIG. 7 is a schematic drawing of the camera that magnetically writes information on rolls of film 41 shown in FIGS. 3–6. Camera apparatus 101 is depicted for use with the type of film cartridge 42 having a normally non-protruding leader 43. Briefly, the camera apparatus 101 is intended to magnetically apply and detect alterable data on roll of film 41 when film leader 43 is located outside cartridge shell 203. The camera apparatus 101 includes a conventional rear or bottom door 103 pivotally mounted on camera body 105 for opening to permit insertion of film cartridge 42 into a loading chamber 107.

Motorized film transport means 109 comprising a conventional bi-directional circuit 111 for reversing a drive motor 113, a suitable drive transmission 115, and respective drive hubs 117 and 119 which engage spool core 230 of cartridge 42 and a take-up spool or drum 121 rotatably supported within a take-up chamber 123, is provided for rotating spool core 230 and take up drum 121 either in the unwinding direction U or in the winding direction W.

Other elements of camera apparatus 101 include a conventional array of DX sensors 131, a conventional metering switch 133, a conventional magnetic read/write head 135, a conventional digital film frame counter 137, a door switch 139, a cartridge switch 141, a film presence switch 138, a timer 165, a normally open shutter release switch 143, a normally open mid-roll interrupt (MRI) switch 145, and respective conventional mid-roll interrupt (MRI), and double exposure prevention (DEP) warning circuits 147, and 151. Each of the elements 133, 137, 138, 139, 141, 143, 145, 147, 151 and 165, as well as film transport means 109, is connected individually to a conventional digital microcomputer 153 such as is used in many recent cameras.

DX sensors 131 are connected to microcomputer 153 via a conventional DX decoder 155, and the read/write head 135 is connected to microcomputer 153 via a conventional read/write circuit 157. The read circuit has two states; data detected, and data not detected. Microcomputer 153 as is customary includes a central processing unit (CPU) 159, a random access memory (RAM) 163, and a read only memory (ROM) 161.

DX sensors 131 are positioned in loading chamber 107 to read a known DX encodement on the outside of cartridge shell 203 which indicates the maximum number (m) of exposures that can be taken, i.e. the total number of available frames on roll of film 41. Metering switch 133 is closed each time a perforation sensor 167 of switch 133 drops into any one of a series of perforation pairs 44 (shown in FIGS. 3–6) in the roll of film 41. As shown in FIGS. 3–6 the perforations 44 are located along one of the edges of roll of film 41 and are separated by respective imperforate sections. The distance between respective perforations having a length slightly greater than the width of a single film frame.

When metering switch 133 is closed twice, it indicates that roll of film 41 has been moved slightly more than a single frame width, and a pulse is generated by microcomputer 153 which may be counted by a conventional up/down counter, frame counter 137. Frame counter 137 displays the number of exposures available at any time on roll of film 41.

Read/write head 135 is intended to magnetically write and detect certain data along side 50 of roll of film 41 (FIGS. 3–6). Data is written along side 50 of roll of film 41 at a location opposite perforations 44.

Film presence switch 138 is closed when roll of film 41 is present at switch 138. Door switch 139 is closed when rear door 103 is closed and is open when rear door 103 is opened. Cartridge switch 141 is closed whenever cartridge 42 is present in loading chamber 107 and is open whenever chamber 107 is empty. Shutter release switch 143 is closed each time a person depresses it and is otherwise open. Mid-roll interrupt (MRI) switch 145 is closed when an MRI button (not shown) on camera body 105 is manually depressed to initiate rewind of roll of film 41 into cartridge 42 prematurely, i.e. before all of the frames on roll of film 41 have been exposed.

Camera 101 is a normal wind camera. If read/write head 145 was moved so that it would be located at position A, camera 101 would represent a prewind camera.

A roll of film 41 will be in one of five conditions when placed in camera apparatus 101 for exposure; fresh, partially exposed in a prewind camera (FIG. 3), partially exposed in a normal wind camera (FIG. 5), partially exposed in both normal wind and prewind cameras (FIG. 4), and fully exposed. Following are descriptions for camera logic that will handle all five conditions in prewind and normal wind cameras.

FIGS. 8A, 8B, 9, and 10 describe the logic for control of a prewind camera. They are flow charts which depict three explicit routines or modes of microcomputer 153 which are effected in cooperation with devices shown in FIG. 7. Read/write head 135 is positioned at position A for a prewind camera.

Figure 8A:
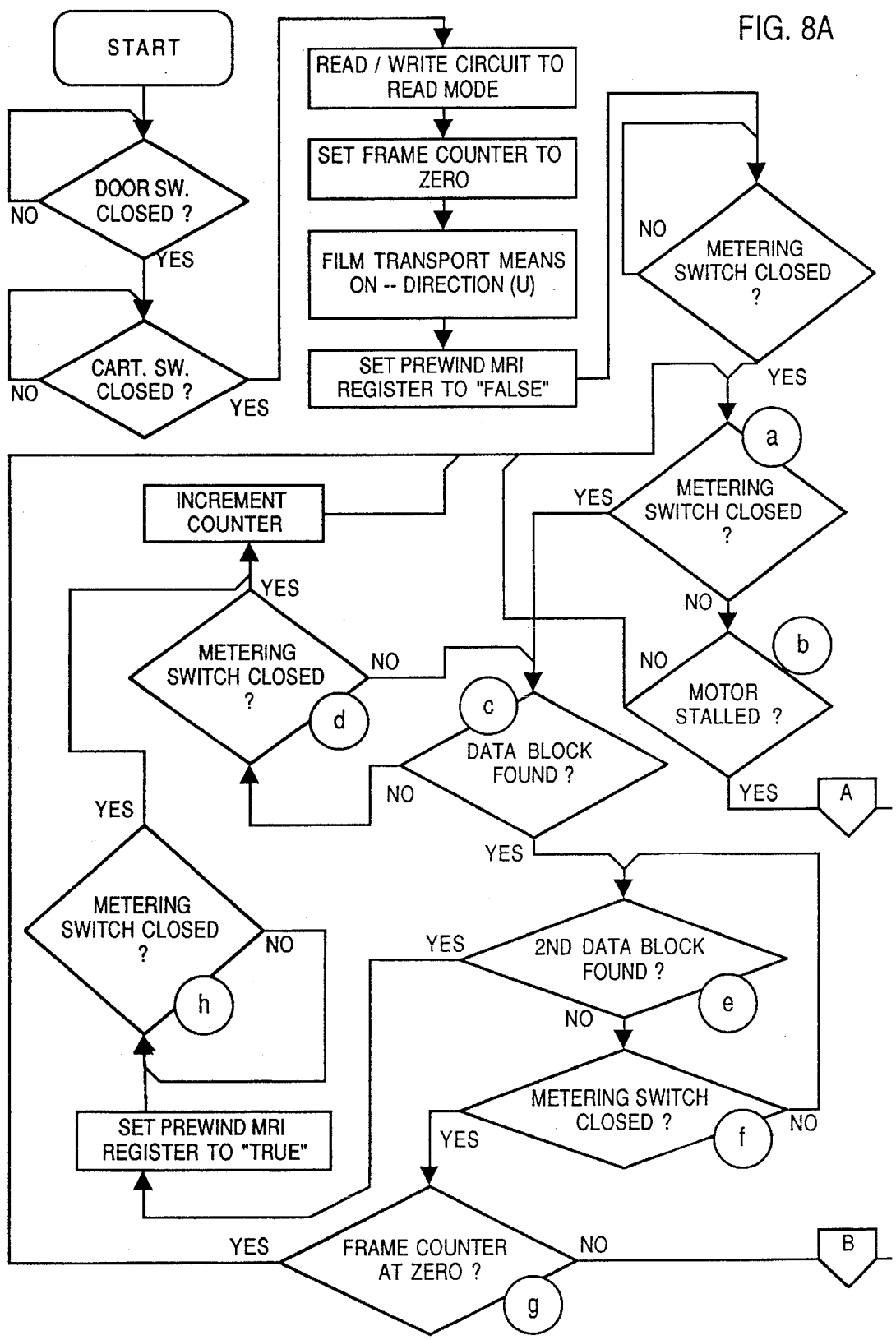
FIGS. 8A and 8B are a flow chart illustrating a load/double exposure prevention (DEP) routine of a prewind camera apparatus.
Figure 8B:
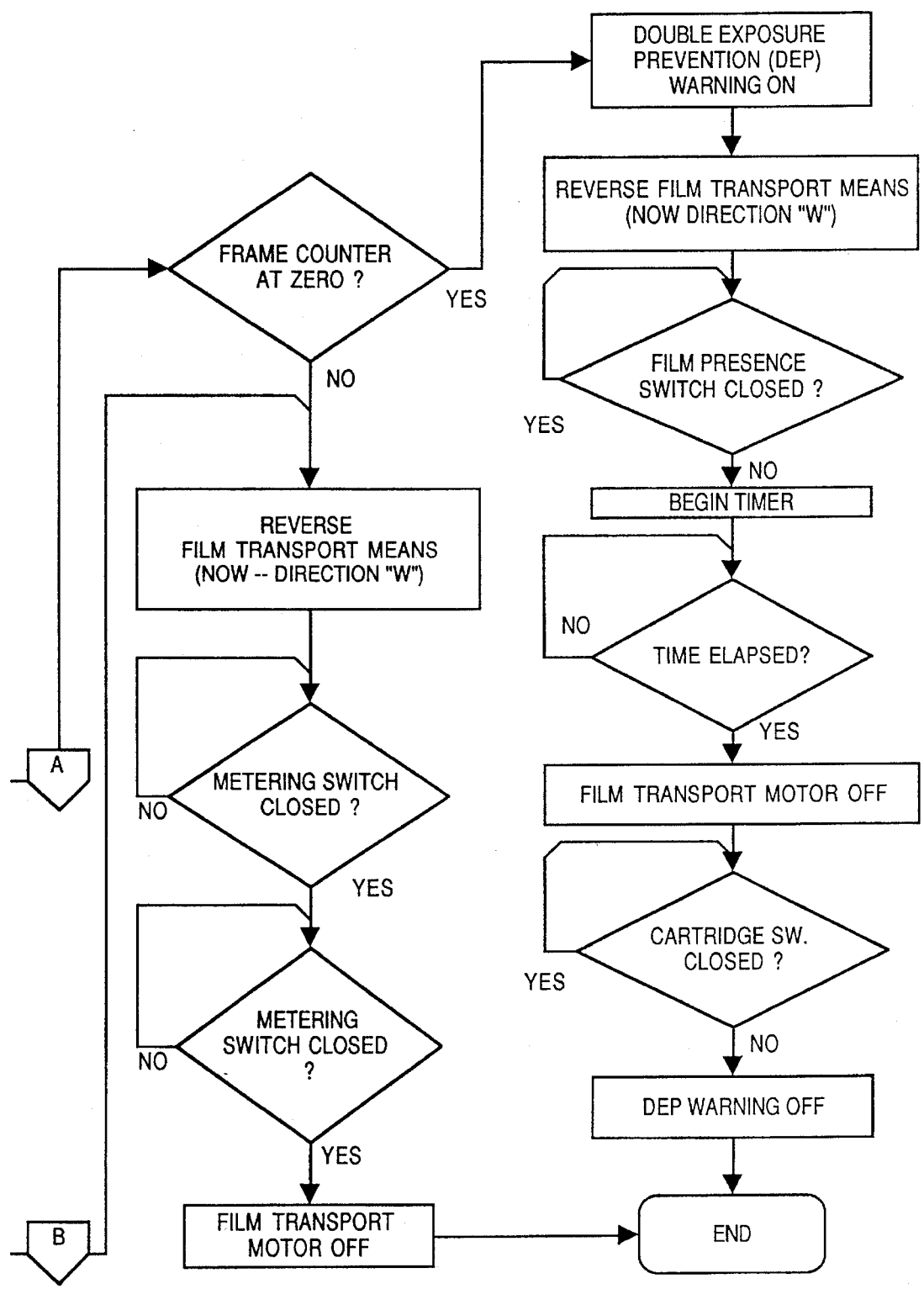

(1) Load/Double Exposure Prevention (DEP) Routine— FIGS. 8A and 8B.

Camera operation begins in this routine. If door switch 139 is closed because rear door 103 is closed, and cartridge switch 141 is closed because cartridge 142 is loaded in loading chamber 107, read/write circuit 157 will assume the read mode to enable magnetic head 135 to determine the presence or absence of a DEP encodement at locations 52 on roll of film 41, the frame counter 137 is set to zero, and motor 113 of film transport means 109 will be operated to rotate spool core 230 of cartridge 42 and take up drum 121 in the unwinding direction U in order to advance roll of film 41 from cartridge 42 onto take-up drum 121 without exposing any of the film frames. The prewind mid-roll interrupt register in RAM 163 is set to "False". Motor 113 continues to run as central processing unit 159 waits for metering switch 133 to close twice, indicating that frame 1 is in the exposure area of the camera.

If roll of film 41 was partially exposed in a normal wind camera as in FIGS. 4 and 5 film transport 109 will advance roll of film 41 past those exposures with the following logic. Central processing unit 159 is executing the loop c–d as film transport 109 is moving frame 2 into back frame opening 125 as read/write head 135 detects the first data encodement 53 at locations 52. The motor continues to run while central processing unit 159 executes loop e–f until another closure of metering switch 133 occurs. The motor will continue to advance roll of film 41 past each frame that was exposed in a normal wind camera as central processing unit 159 executes the steps labeled g, a, b, c, d, e, and f as described above until the frame without continuous data, frame 3, is found.

Execution will leave the loop c–d if no data at a frame was detected and will leave the loop e–f if two blocks of data are found before the next closure of metering switch 133. At this point all but the fully exposed roll of film 41 will have its lowest numbered unexposed frame just leaving back frame opening 125. Film transport 109 will continue to move roll of film 41 in direction U until all unexposed frames have passed, counting them as they go by back frame opening 125 with the following logic. If no data exists in locations 52 execution will alternate between loops a–b and c–d as the counter is incremented. If two bursts of data 51 are found at location 52, roll of film 41 has been in a prewind camera. Execution will leave the loop e–f at e. The prewind MRI register in random access memory 163 is set to "true" indicating that two bursts data has been found. The frame counter 137 is incremented and central processing unit 159 executes the loops a–b, c–d, e–f and h as described above, incrementing the counter as it counts available exposure locations.

If one burst of data 53 is found in location 52 some exposures made in a prewind camera have been found. Execution will leave loop e–f at step f. If the end of roll of film 41 is reached, execution leaves loop a–b at step b. Since the frame counter is not zero film transport means 109 will be changed from direction U to direction W. When metering switch 133 closes twice because the next available unexposed frame has been moved to the exposure position at back frame opening 125, motor 113 will be de-energized and use of this routine is finished.

If roll of film 41 is completely exposed, read/write head 135 will find all frames with continuous recorded data and motor 113 will stall. Then, since the frame counter equals zero, DEP warning circuit 151 will be activated to alert the user that roll of film 41 is completely exposed.

Film transport means 109 will be changed from direction U to direction W to return roll of film 41 to cartridge 42. Motor 113 will run until film presence switch 138 opens and timer 165 times out. When timer 165 determines that a sufficient time, e.g. one-half second, has elapsed to rewind film leader 43 into cartridge 42, motor 113 will be de-energized. Since DEP warning circuit 151 remains activated, the user is reminded to remove cartridge 42 from loading chamber 107, whereupon the circuit will be deactivated.

Figure 9:
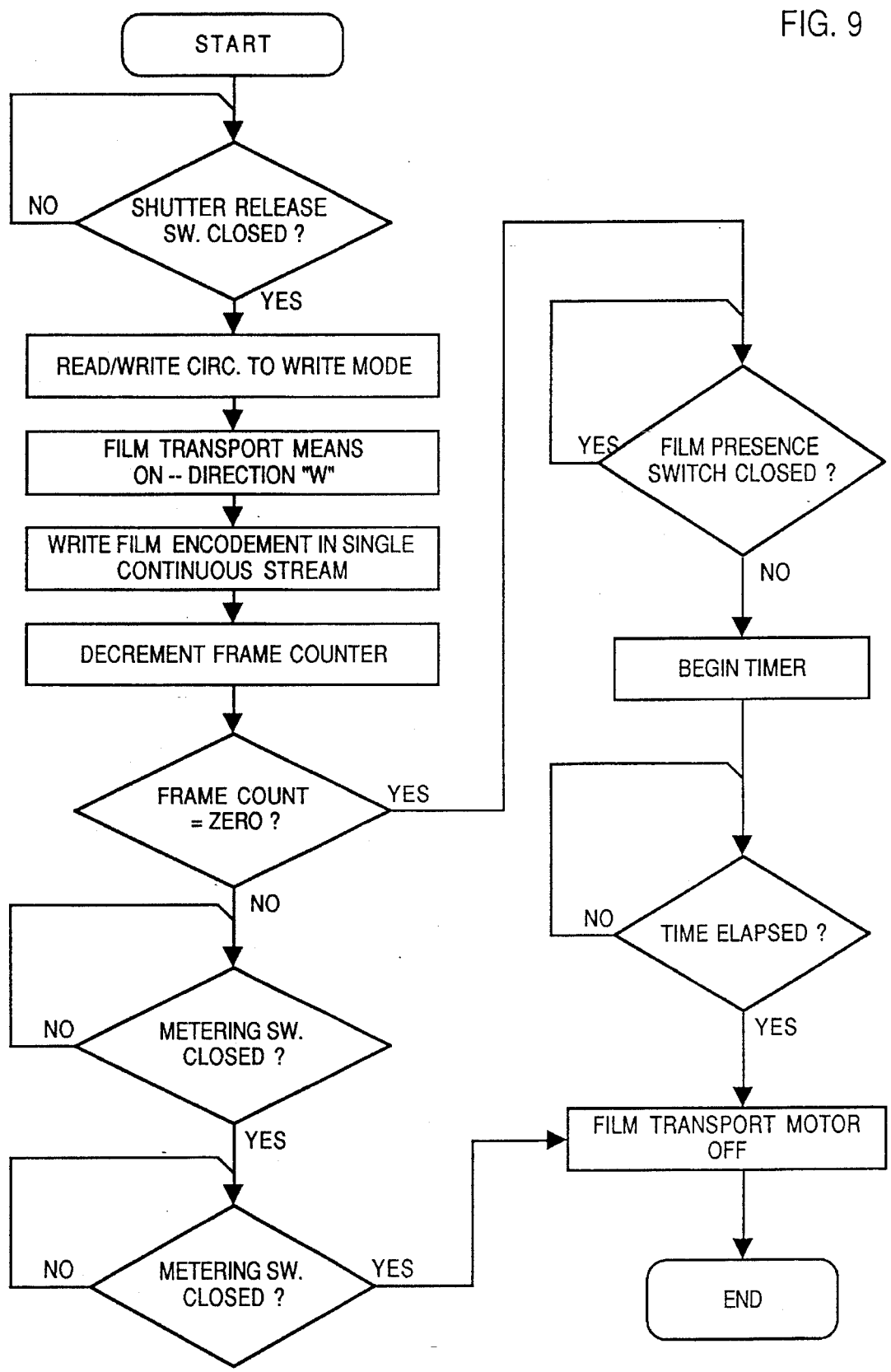
FIG. 9 is a flow chart illustrating an exposure routine of a prewind camera apparatus.

(2) Exposure Routine—FIG. 9

If in this routine shutter release switch 143 is closed because the camera shutter is activated, read/write circuit 157 will assume the write mode, and film transport means 109 will be operated in direction W to rewind the exposed frame into cartridge 42 and to move the next available unexposed frame to the exposure position at the back of frame opening 125. As the exposed frame is moved out of the exposure position, read/write head 135 will write continuous data at location 52 on roll of film 41 to indicate that particular frame is exposed. Frame counter 137 is decremented. If frame counter 137 does not equal zero, motor 113 will continue to run until metering switch 133 closes twice. Since the next available unexposed frame has been moved to the exposure position, motor 113 will be de-energized. If frame counter 137 does equal zero, motor 113 continues to run until film presence switch 138 opens and timer 165 times out to wind leader 43 fully back into cartridge 42.

Figure 10:
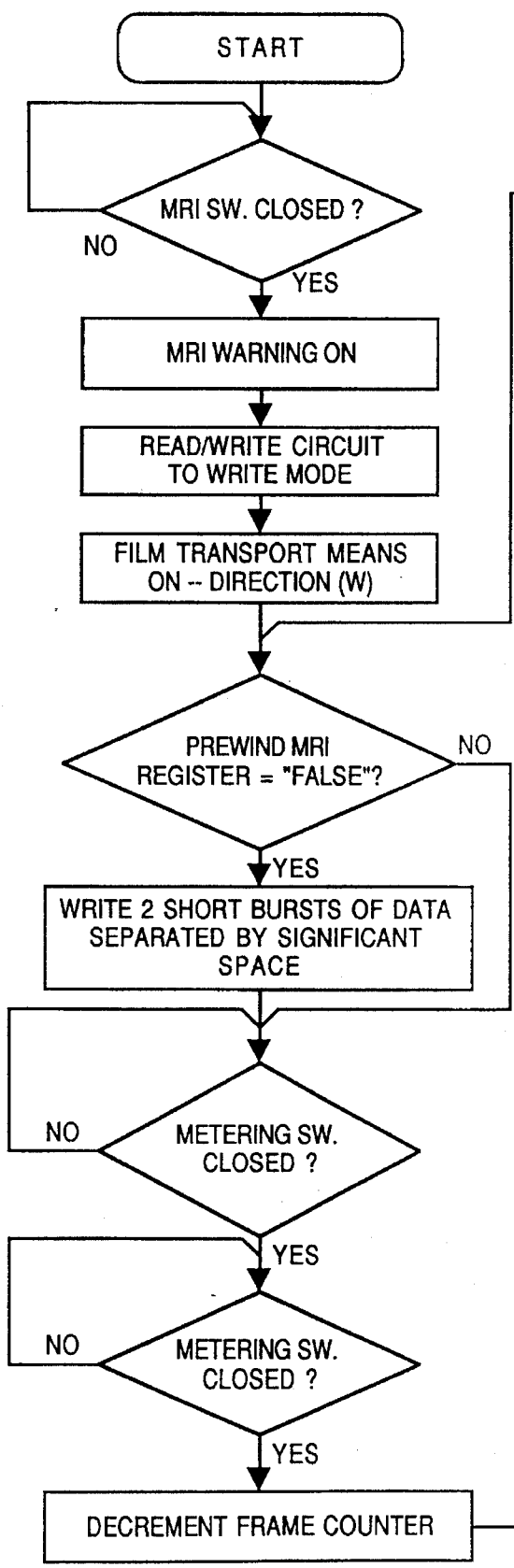
FIG. 10 is a flow chart illustrating a mid-roll interrupt (MRI) routine of a prewind camera apparatus.
Figure 10:
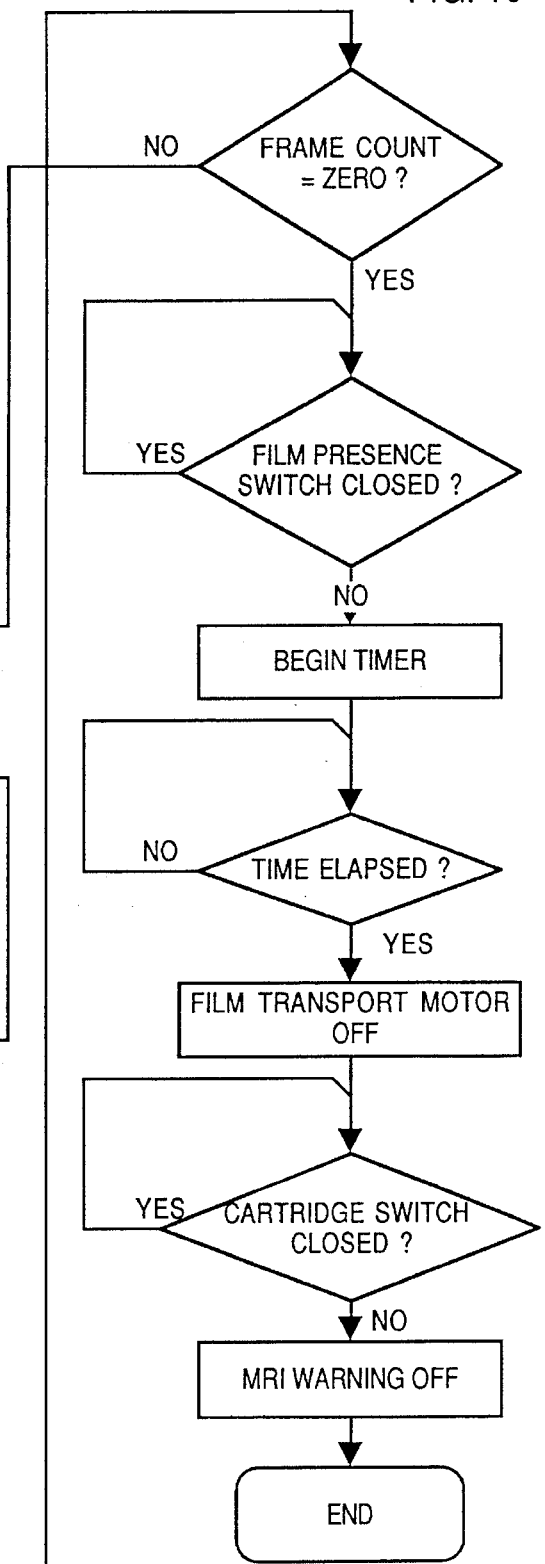

(3) Mid-roll Interrupt (MRI) Routine—FIG. 10

If in this routine MRI switch 145 is closed because the user has manually depressed MRI switch 145, MRI warning circuit 147 will be activated to alert the user of such condition, read write circuit is set to write mode, and film transport means 109 will be operated in direction W to rewind all of roll of film 41 into cartridge 42. As each frame location 52 passes write head 135, two short bursts of data separated by significant space are written while film frame counter 137 is greater than zero and prewind MRI register equals false. After each frame goes by head 135, counter 137 is decremented. When counter 137 reaches zero, motor 113 continues to rewind until film presence switch 138 opens (but no data is written). Then, after timer 165 has timed-out as in the load routine of FIG. 8, motor 113 will be de-energized. Since MRI circuit 147 remains activated, the user is reminded to remove cartridge 42 from loading chamber 107, whereupon the circuit will be deactivated.

FIGS. 11A, 11B, 11C, 12, and 13 describe the logic for a normal wind camera. They are flow charts which depict three explicit routines or modes of microcomputer 153 which are effected in cooperation with switches 133, 138, 139, 141, 143 and 145, with film transport means 109, with read/write head 135, positioned as shown in FIG. 7 for a normal wind camera and with mid-roll interrupt (MRI) and double exposure prevention (DEP) warning circuits 147 and 151, frame counter 137, timer 165 and DX decoder 155 are as described above. Central processing unit 159 maintains counts of unexposed prewind frames and exposed normal wind frames in respective registers in random access memory 163.

Figure 11A:
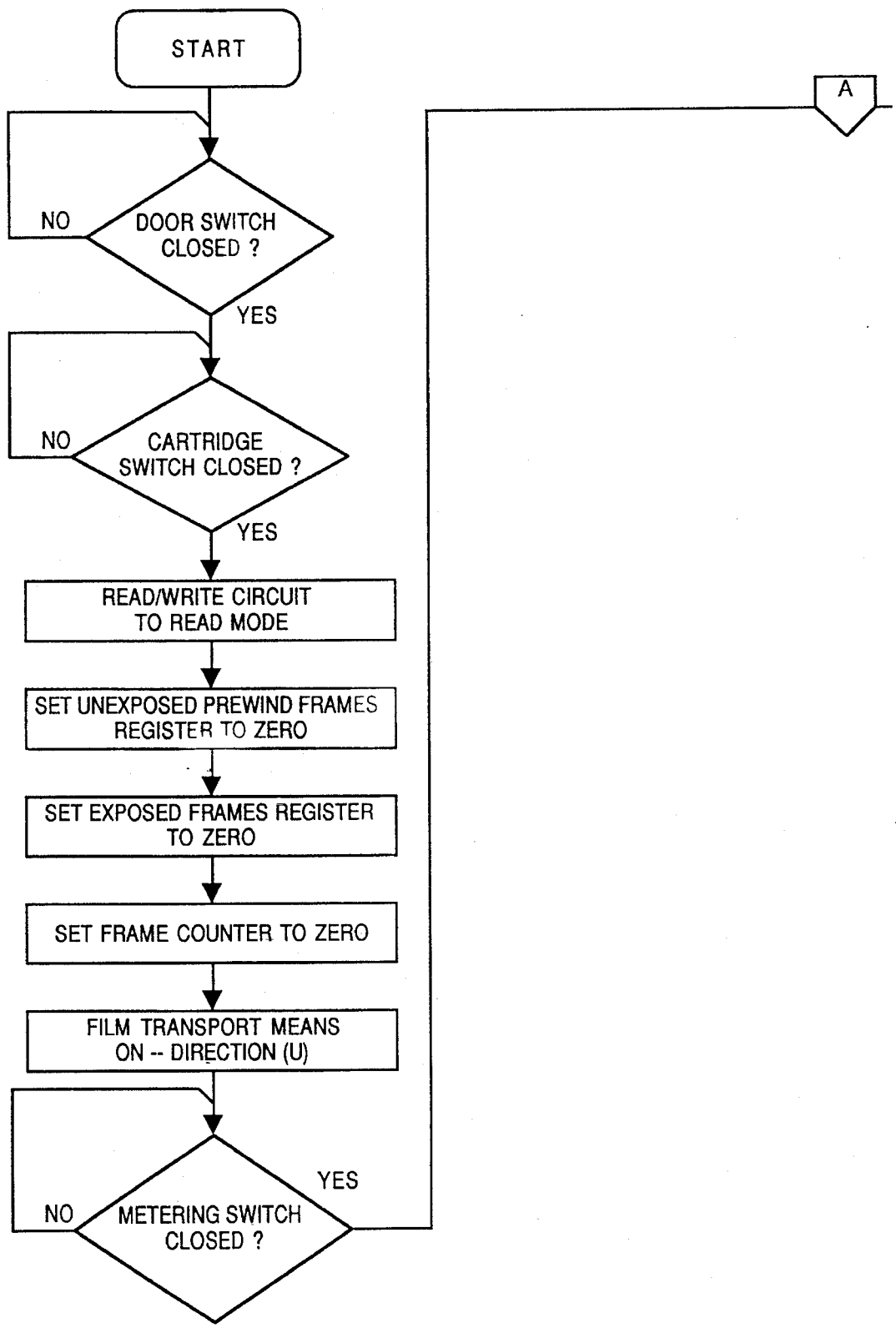
FIGS. 11A, 11B and 11C are a flow chart illustrating a load/double exposure prevention (DEP) routine of a normal wind camera apparatus.
Figure 11B:
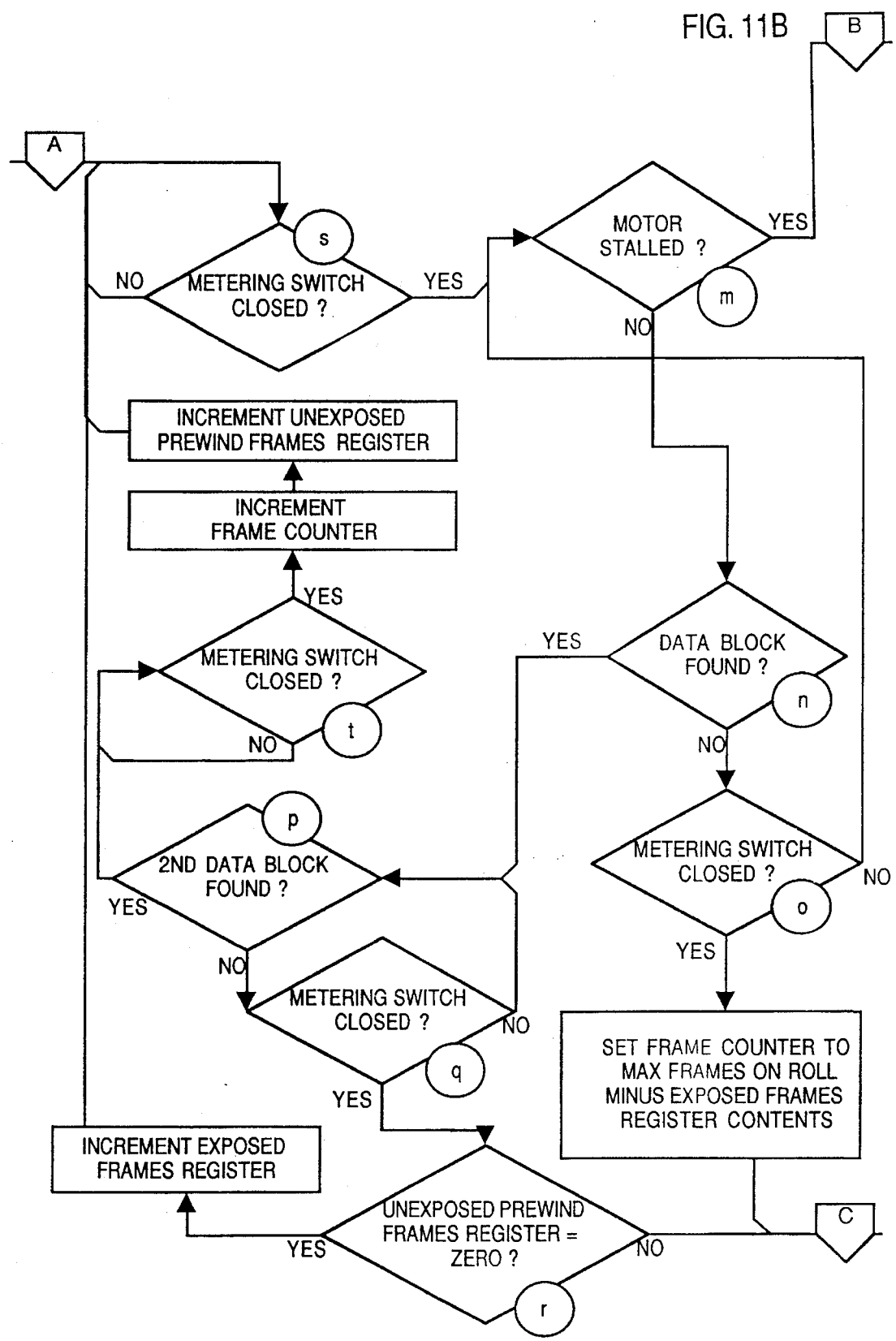
Figure 11C:
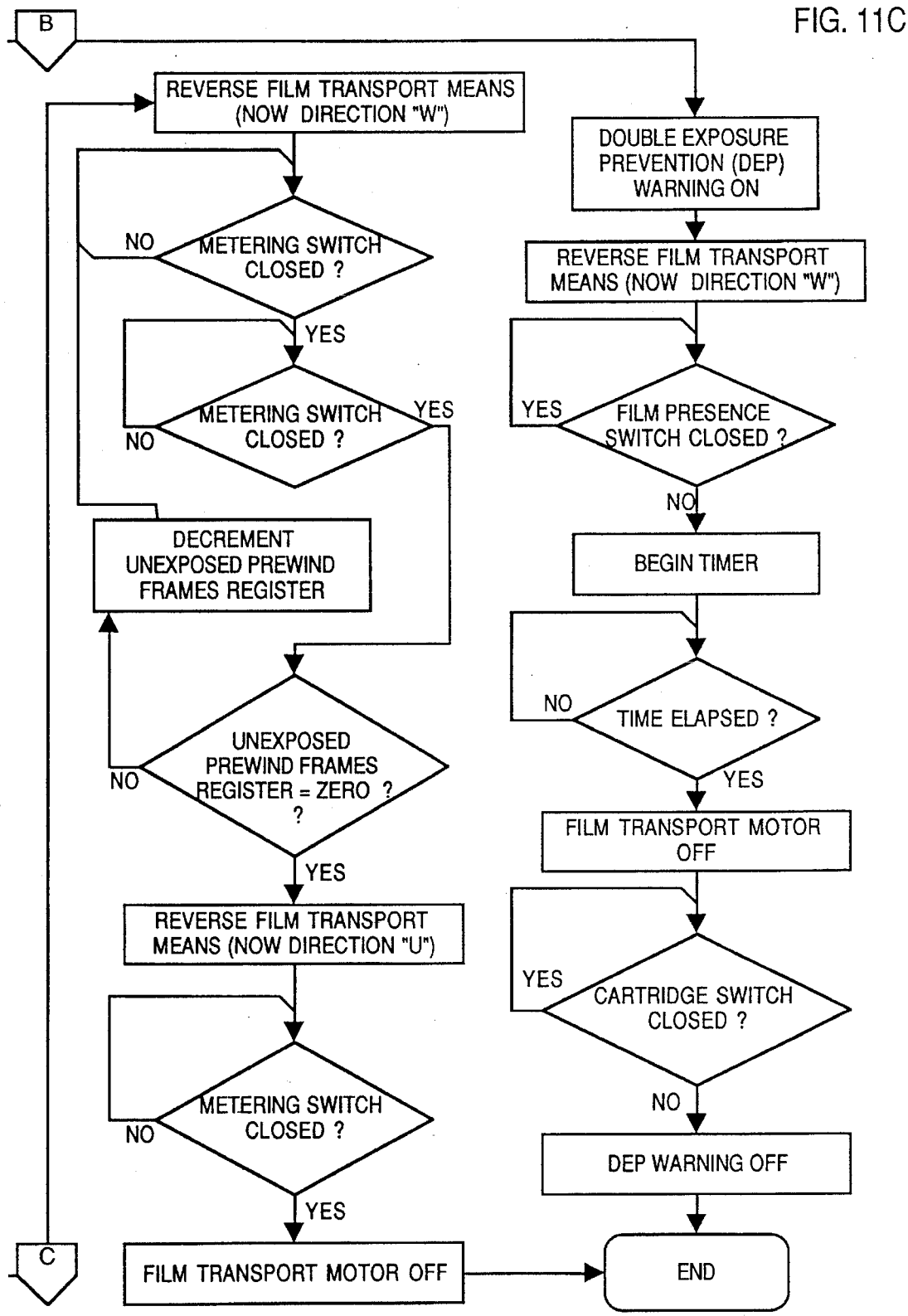

(1) Load/Double Exposure Prevention (DEP) Routine— FIGS. 11A, 11B and 11C

Camera operation begins in this routine when door switch 139 is closed because rear door 103 is closed, and cartridge switch 141 is closed because cartridge 42 is loaded in loading chamber 107, read/write circuit 157 will assume the read mode to enable magnetic head 135 to determine the presence or absence of data at locations 52 on roll of film 41. Microcomputer 153 initializes two variables in random access memory 163 as follows: "unexposed prewind frames" register =0, and "exposed frames" register =0, and frame counter 137 is also set to zero. Film transport means 109 will be operated in the unwind mode (U) to rotate spool core 230 of cartridge 42 in the unwinding direction and to rotate take-up drum 121 in the same direction in order to advance roll of film 41 from cartridge 42 onto take-up drum 121 without exposing any of the film frames.

Motor 113 runs, transporting roll of film 41 until metering switch 133 closes two times indicating that roll of film 41 is at exposure 1 position. Logic steps m, n, o, are looped while motor 113 continues to run until metering switch 133 closes again while read/write circuit 157 reads (watching for recorded data). If no recording was found, roll of film 41 is fresh. Since exposed frame register equals zero, frame counter 137 is set to the maximum # of frames available on roll of film 41. Film transport means 109 is reversed (now direction W). Motor 113 runs until metering switch 133 closes twice. Since the unexposed frame register equals zero film transport means 109 reverses again and runs until metering switch 133 closes once again. Roll of film 41 is now positioned for exposure and use of this routine is finished.

If read/write circuit 157 detected one continuous recording of data while central processing unit 159 was executing steps m, n, o execution transfers to loop p–q. If a second block of data was not found by the time metering switch 133 closed and unexposed prewind frame register does equal zero, exposed frames register in random access memory 163 is incremented and motor 113 continues to run as metering switch 133 closes again at step s.

Central processing unit 159 repeats the above cycle (logic loop m, n, o, loop p, q and q, r, s, m) until a second metering switch closure occurs at logic step o or a second data block is found at step p or motor 113 stalls at step m.

If the second metering switch closure occurred at step o, a frame was found with no recorded data. That frame is the first available exposure location. (Since, no double burst data was found, roll of film 41 was not partially exposed in a prewind camera). Frame counter 137 is set to the difference between contents of the "exposed frames register" and the maximum number of exposures on roll of film 41. Film transport means 109 is reversed and run until the metering switch 133 closes twice. Since the unexposed prewind frame register equals zero film transport means 109 reverses again and runs until the metering switch closes again. Roll of film 41 is now positioned for exposure, and use of this routine is finished.

If a second data block was found at logic step p (two bursts of data are found either at frame 1 or after the normal wind camera's continuous data marked frames) then roll of film 41 has some exposures made by a prewind camera (i.e. starting from spool core 230). Frame counter 137 is incremented. The "unexposed prewind frames" register is incremented and motor 113 continues to run while metering switch 113 closes again at step 5. Now the central processing unit 159 is executing the loop m, n, o, loop p, q loop t, and s back to m as described above as long as second data blocks are found at step p incrementing the frame counter 137 and unexposed prewind frames register of random access memory 163 each time steps t–s are executed. If a second data block is not found, that is, metering switch 133 closes at logic step "q" a frame with a continuous recording (without a second recording) is found. The last available exposure location has been passed. Frame counter 137 and the "unexposed prewind frames" register indicate the number of unexposed frames available. Since the "unexposed prewind frames" register does not equal zero film transport means 109 reverses and runs decrementing the "unexposed prewind frames" register once for each two metering switch 133 closures until the "unexposed prewind frames" register equals zero. Film transport means 109 reverses again and runs until metering switch closure occurs. Roll of film 41 is now positioned for exposure and use of this routine is finished.

If motor 113 stalls (logic step m) roll of film 41 was fully exposed. The DEP warning is turned on, motor 113 is reversed and roll of film 41 is wound back into cartridge 42 until film presence switch 138 closes. A timer continues the motor drive to wind the last bit of roll of film 41 into cartridge 42, the DEP warning goes off when the user removes cartridge 42 opening cartridge switch 141.

Figure 12:
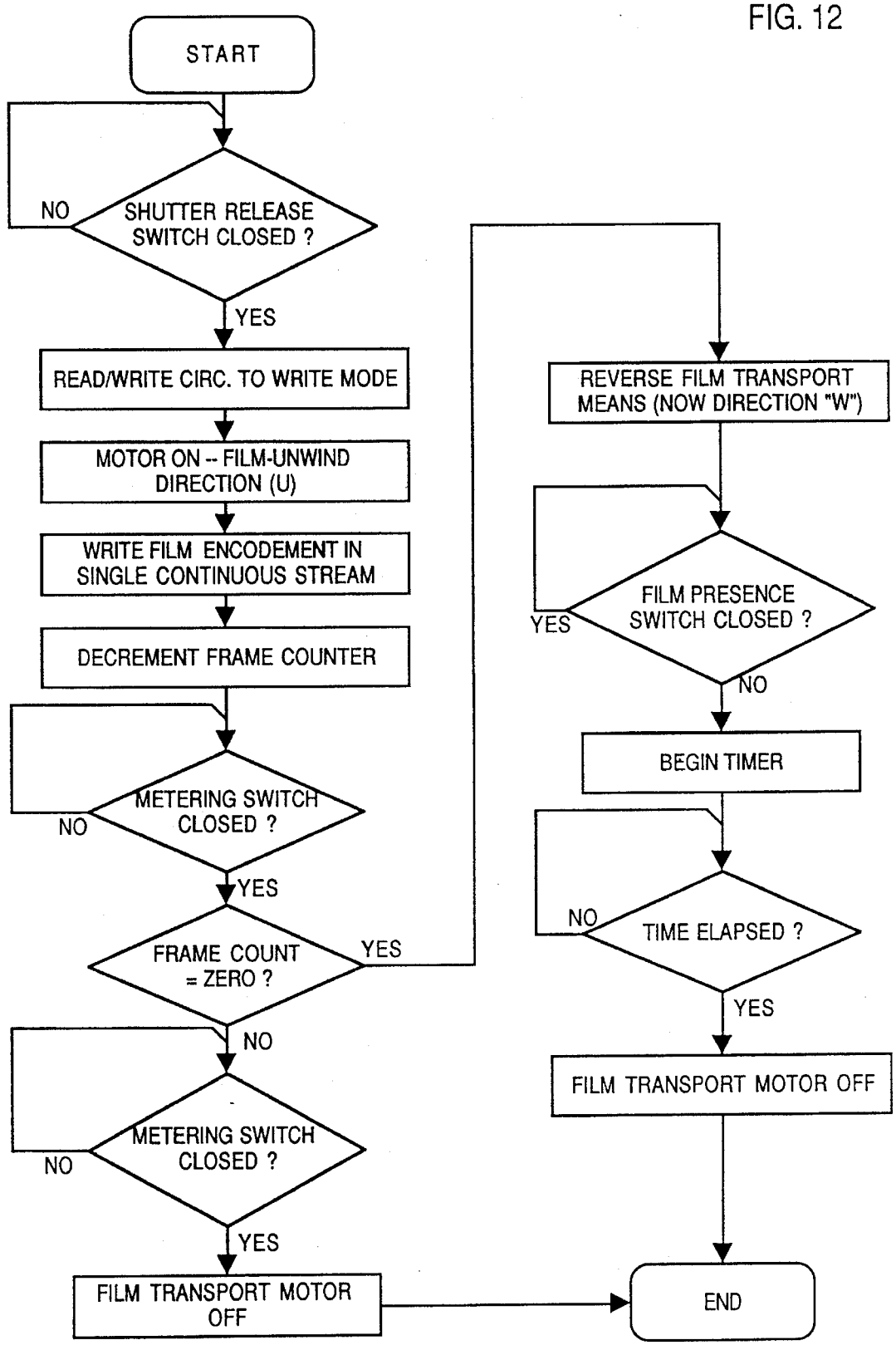
FIG. 12 is a flow chart illustrating an exposure routine of a normal wind camera apparatus.

(2) Exposure Routine-FIG. 12

If in this routine shutter release switch 143 is closed because the camera shutter is activated, read/write circuit 157 will assume the write mode, and film transport means 109 will be operated in direction U to wind the exposed frame onto take-up drum 121 and to move the next available unexposed frame to the exposure position at the back of frame opening 125. As the exposed frame is moved out of the exposure position, read/write head 135 will write continuous data at location 52 on roll of film 41 adjacent the exposed frame to indicate that that particular frame is exposed. Frame counter 137 is decremented. If frame counter 137 does not equal zero, motor 113 will stop when the second metering switch 133 closure occurs. When frame counter 137 equals zero, film transport means 109 reverses to wind roll of film 41 back into cartridge 42. When film presence switch 138 opens, motor 113 runs for a predetermined time interval to wind leader 43 fully back into cartridge 42.

Figure 13:
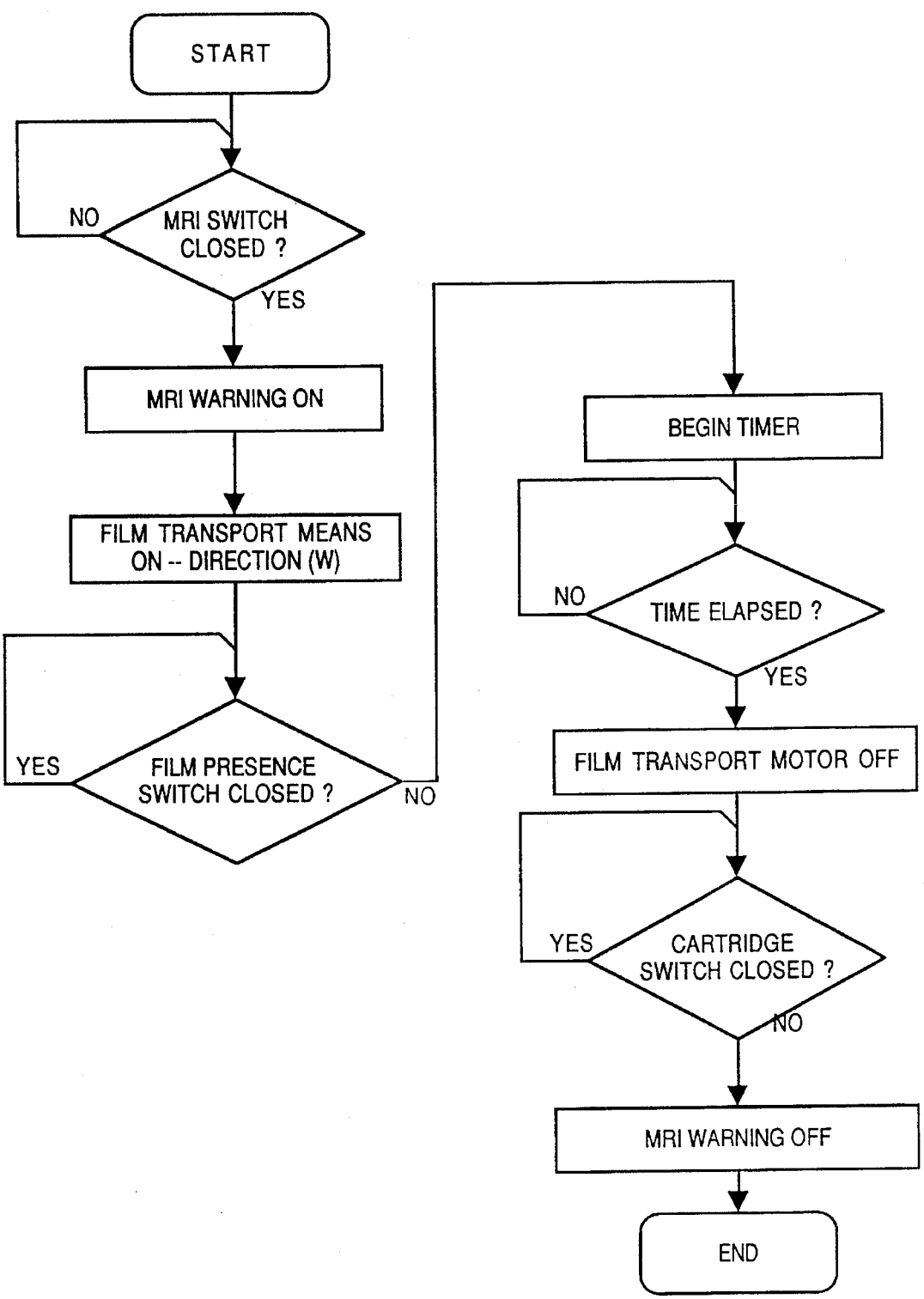
FIG. 13 is a flow chart illustrating a mid-roll interrupt (MRI) routine of a prewind camera apparatus.

(3) Mid-roll Interrupt (MRI) Routine—FIG. 13

If in this routine MRI switch 145 is closed because the user has manually depressed MRI switch 145, MRI warning circuit 147 will be activated to alert the user of such condition, and film transport means 109 will be operated in direction W to rewind all of roll of film 41 into cartridge 42 i.e., until film presence switch 138 opens. Then, after timer 165 has timed-out, motor 113 will be de-energized. Since MRI circuit 147 remains activated, the user is reminded to remove cartridge 42 from loading chamber 107, whereupon the circuit will be deactivated.

The above specification describes new and improved cameras of the prewind and normal wind types that write data on a roll of film to indicate where specific frames on the roll of film have been exposed and unexposed and detects the presence of that data on the film to determine where additional exposures may be made on the roll of film. It is realized that the above description may indicate to those skilled in the art additional ways in which the principles of this invention may be used without departing from the spirit. For example, while the foregoing description is for an embodiment in which two separated bursts of data are used by a prewind camera to mark unexposed frames, multiple data bursts of three or more may alternatively be employed with similar logic. This latter approach would be particularly useful as a means of reliably differentiating between unexposed frames and an exposed frame with normal continuous data recording which might be separated by an unwanted data drop-out caused, for example, by a temporary read write failure. It is, therefore, intended that this invention be limited only by the scope of the appended claims.

Parts List frames 1–40
roll of film 41
cartridge 42
leader end 43
perforations 44
magnetic layer 45
location 46
location 47
location 48
location 49
side 50
data 51
locations 52
location 53
location 54
camera apparatus 101
rear or bottom door 103
camera body 105
loading chamber 107
film transport means 109
bi-directional circuit 111
drive motor 113
drive transmission 115
drive hub 117 drive hub 119
take-up spool or drum 121
take-up chamber 123
back frame opening 125
taking lens 127
DX sensors 131
metering switch 133
magnetic read/write head 135
digital film frame counter 137
film presence switch 138
door switch 139
cartridge switch 141
shutter release switch 143
mid-roll interrupt switch 145
mid-roll warning circuit 147
double exposure warning circuit 151
microcomputer 153
DX decoder 155
read/write circuit 157
central processing unit 159
read only memory 161
random access memory 163
timer 165
perforation sensor 167
cartridge shell 203
spool core 230

What is claimed is:

1. A camera comprising:

means for imaging scene light onto a roll of film contained in the camera when a photograph is taken; and recording device means for writing data on the roll of film contained in the camera when a photograph is taken to indicate that a photograph has been taken;

wherein the recording device means writes different data on the roll of film corresponding to each unexposed frame of film to indicate that specific frames on the roll of film have not been exposed; and wherein the recording device means writes continuous data to indicate an exposed frame on the roll of film and writes multiple separated bursts of data to indicate frames on the roll of film that have not been exposed.

2. The camera claimed in claim 1, wherein the recording device means writes the continuous data in the vicinity of the exposed frame to indicate a photographic exposure and writes the separated bursts of data in the vicinity of the frames that have not been exposed.

3. A camera having a mid-roll interrupt and a reading means for reading data and a writing means for writing data, is characterized by:

the writing means writes data on a roll of film contained in the camera when a photograph is taken to indicate that a photograph has been taken, the writing means writes different data on the roll of film corresponding to each unexposed frame of film when the mid-roll interrupt is activated to indicate that specific frames on the roll of film have not been exposed and the reading means detects the data written on the roll of film to determine whether or not individual exposures have been made;

wherein the writing means writes continuous data to indicate an exposed frame on the roll of film and writes multiple separated bursts of data to indicate frames on the roll of film that have not been exposed.

4. The camera claimed in claim 3, wherein the writing means writes the continuous data in the vicinity of the exposed frame to indicate a photographic exposure and writes the separated bursts of data in the vicinity of frames that have not been exposed.

5. A normal wind mid-roll interrupt camera having a mid-roll interrupt and a means for reading data and a means for writing data, is characterized by:

the writing means writes continuous data on a roll of film contained in the camera when a photograph is taken to indicate that a photograph has been taken, and the reading means detects the continuous data indicating that a photograph has been taken as well as detecting multiple separated bursts of data written by a prewind camera to determine if exposures have been made on the roll of film.

6. The camera claimed in claim 5, wherein the writing means writes the continuous data in the vicinity of the exposed frame to indicate photographic exposure.

\* \* \* \* \*